US007949793B1

(12) United States Patent
James-Roxby et al.

(10) Patent No.: US 7,949,793 B1
(45) Date of Patent: May 24, 2011

(54) METHOD AND APPARATUS FOR PROVIDING AN INTERFACE BETWEEN A PROGRAMMABLE CIRCUIT AND A PROCESSOR

(75) Inventors: Philip B. James-Roxby, Longmont, CO (US); Gordon J. Brebner, Los Gatos, CA (US)

(73) Assignee: Xilinx, Inc., San Jose, CA (US)

( * ) Notice: Subject to any disclaimer, the term of this patent is extended or adjusted under 35 U.S.C. 154(b) by 1002 days.

(21) Appl. No.: 11/228,938

(22) Filed: Sep. 16, 2005

(51) Int. Cl.
*G06F 3/00* (2006.01)
(52) U.S. Cl. ............................................ 710/5; 710/305
(58) Field of Classification Search ................ 710/5, 305
See application file for complete search history.

(56) References Cited

U.S. PATENT DOCUMENTS

| 5,978,858 | A | * | 11/1999 | Bonola et al. ................. 710/1 |
| 6,134,630 | A | * | 10/2000 | McDonald et al. ........... 711/114 |
| 6,216,191 | B1 | * | 4/2001 | Britton et al. ................ 710/305 |
| 6,255,848 | B1 | * | 7/2001 | Schultz et al. ................. 326/41 |
| 7,065,601 | B2 | * | 6/2006 | Ryan et al. ................... 710/305 |
| 7,225,278 | B1 | * | 5/2007 | Baxter et al. ................... 710/22 |
| 7,228,520 | B1 | * | 6/2007 | Keller et al. .................. 716/17 |

OTHER PUBLICATIONS

U.S. Appl. No. 10/912,844, filed Aug. 6, 2004, Ansari et al.
U.S. Appl. No. 08/102,011, filed Aug. 3, 1993, Trimberger.
Rosinger, Hans-Peter, "Connecting Customized IP to the MicroBlaze Soft Processor Using the Fast Simplex Link (FSL) Channel", XAPP529, May 12, 2004, pp. 1-12, v1.3, available from Xilinx, Inc., 2100 Logic Drive, San Jose, CA 95124.
James-Roxby, Phil et al., "Time-Critcal Software Deceleration in an FCCM", Proceeding of the 12th Annual IEEE Symposium on Field-Programmable Custom Computing Machines (FCCM'04), pp. 1-10, 2004, available from Xilinx, Inc. 2100 Logic Drive, San Jose, CA 95124.

* cited by examiner

*Primary Examiner* — Henry W Tsai
*Assistant Examiner* — Elias Mamo
(74) *Attorney, Agent, or Firm* — Robert M. Brush; John J. King; Thomas George

(57) ABSTRACT

Method and apparatus for interfacing a programmable circuit and a processor is described. In one example, data output from the programmable circuit is packetized to form at least one packet. The at least one packet is provided to the processor via a streaming interface. The data is extracted from the at least one packet. A function is executed on the processor using the data as parametric input. Return data is then packetized by the function in response to the parametric input to produce at least one return packet. The at least one return packet is send towards the programmable circuit via the streaming interface. The return data is extracted from the at least one return packet and provided to the programmable circuit.

17 Claims, 4 Drawing Sheets

METHOD AND APPARATUS FOR PROVIDING AN INTERFACE BETWEEN A PROGRAMMABLE CIRCUIT AND A PROCESSOR

FIELD OF THE INVENTION

One or more aspects of the present invention relate generally to digital logic circuits and, more particularly, to a method and apparatus for providing an interface between a logic circuit and a processor.

BACKGROUND OF THE INVENTION

Programmable logic devices (PLDs) exist as a well-known type of integrated circuit (IC) that may be programmed by a user to perform specified logic functions. There are different types of programmable logic devices, such as programmable logic arrays (PLAs) and complex programmable logic devices (CPLDs). One type of programmable logic device, known as a field programmable gate array (FPGA), is very popular because of a superior combination of capacity, flexibility, time-to-market, and cost.

An FPGA typically includes an array of configurable logic blocks (CLBs) surrounded by a ring of programmable input/output blocks (IOBs). The CLBs and IOBs are interconnected by a programmable interconnect structure. The CLBs, IOBs, and interconnect structure are typically programmed by loading a stream of configuration data (known as a bitstream) into internal configuration memory cells that define how the CLBs, IOBs, and interconnect structure are configured. An FPGA may also include various dedicated logic circuits, such as memories, digital clock managers (DCMs), and input/output (I/O) transceivers. Notably, an FPGA may include one or more embedded processors.

Some system designs employ a combination of hardware configured using the programmable logic of an FPGA and software running on a processor embedded within the FPGA. The most frequent use model is that of the hardware accelerator, in which a logic circuit configured using programmable logic acts as a programmable adjunct to a host processor. The hardware accelerator is used to tackle sub-problems that have been identified as computational bottlenecks in the host processor's software. Another emerging use model is that of a software assistant, in which the processor acts as a computational adjunct to a logic circuit configured in programmable logic. This use model essentially allows software procedure calls to be made from programmed logic.

The main benefits of using the software assistant model lie in using an embedded processor to save logic resources in the PLD and in simplifying design and verification. However, both the software assistant model and the hardware accelerator model are affected by the logic-processor interface. Notably, a bottleneck at the logic-processor interface deleteriously affects the performance of both the hardware accelerator model and the software assistant model. Accordingly, there exists a need in the art for an efficient method and apparatus for providing an interface between a logic circuit and a processor.

SUMMARY OF THE INVENTION

Method and apparatus for interface a logic circuit and a processor is described. In one embodiment, data output from the logic circuit is packetized to form at least one packet. The at least one packet is provided to the processor via a streaming interface. The data is extracted from the at least one packet. A function is executed on the processor using the data as parametric input. Return data is then packetized by the function in response to the parametric input to produce at least one return packet. The at least one return packet is send towards the logic circuit via the streaming interface. The return data is extracted from the at least one return packet and provided to the logic circuit.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

Method and apparatus for providing an interface between a logic circuit and a processor is described. One or more aspects of the invention are described with respect to a logic circuit configured in a field programmable gate array (FPGA) and a processor embedded in the FPGA. Those skilled in the art will appreciate that the invention may be employed with other types of integrated circuits, such as complex programmable logic devices (CPLDs), application specific integrated circuits (ASICs), and the like. In addition, those skilled in the art will appreciate that the invention may be used with discrete logic circuitry and a discrete processor.

Figure 1:
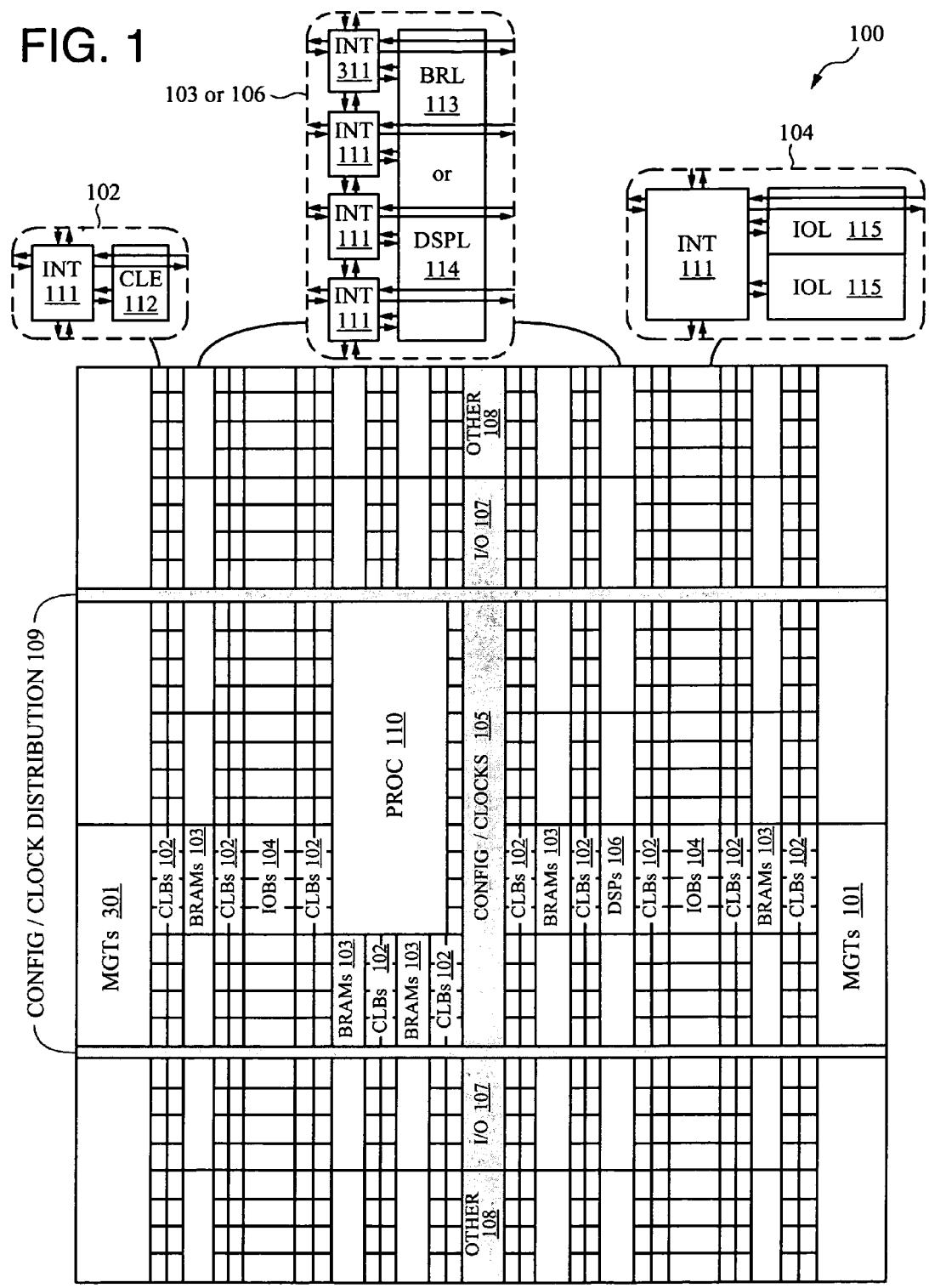
FIG. 1 illustrates an FPGA architecture in accordance with one or more aspects of the invention.

FIG. 1 illustrates an FPGA architecture 100 that includes a large number of different programmable tiles including multi-gigabit transceivers (MGTs 101), configurable logic blocks (CLBs 102), random access memory blocks (BRAMs 103), input/output blocks (IOBs 104), configuration and clocking logic (CONFIG/CLOCKS 105), digital signal processing blocks (DSPs 106), specialized input/output blocks (I/O 107) (e.g., configuration ports and clock ports), and other programmable logic 108 such as digital clock managers, analog-to-digital converters, system monitoring logic, and so forth. Some FPGAs also include dedicated processor blocks (PROC 110).

In some FPGAs, each programmable tile includes a programmable interconnect element (INT 111) having standardized connections to and from a corresponding interconnect element in each adjacent tile. Therefore, the programmable interconnect elements taken together implement the programmable interconnect structure for the illustrated FPGA. The programmable interconnect element (INT 111) also includes the connections to and from the programmable logic element within the same tile, as shown by the examples included at the top of FIG. 1.

For example, a CLB 102 can include a configurable logic element (CLE 112) that can be programmed to implement user logic plus a single programmable interconnect element (INT 111). A BRAM 103 can include a BRAM logic element (BRL 113) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element (DSPL 114) in addition to an appropriate number of programmable interconnect elements. An IOB 104 can include, for example, two instances of an input/output logic element (IOL 115) in addition to one instance of the programmable interconnect element (INT 111). As will be clear to those of skill in the art, the actual I/O pads connected, for example, to the I/O logic element 115 are manufactured using metal layered above the various illustrated logic blocks, and typically are not confined to the area of the input/output logic element 115.

In the pictured embodiment, a columnar area near the center of the die (shown shaded in FIG. 1) is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block PROC 110 shown in FIG. 1 spans several columns of CLBs and BRAMs.

The processor block PROC 110 comprises a microprocessor core, as well as associated control logic. Notably, such a microprocessor core may include embedded hardware or embedded firmware or a combination thereof for a "hard" or "soft" microprocessor. A soft microprocessor may be implemented using the programmable logic (e.g., CLBs 102, IOBs 104, etc.). For example, a MICROBLAZE soft microprocessor, available from Xilinx of San Jose, Calif., may be employed. A hard microprocessor may be implemented using an IBM POWER PC, Intel PENTIUM, AMD ATHLON, or like type processor core known in the art.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic.

Figure 2:
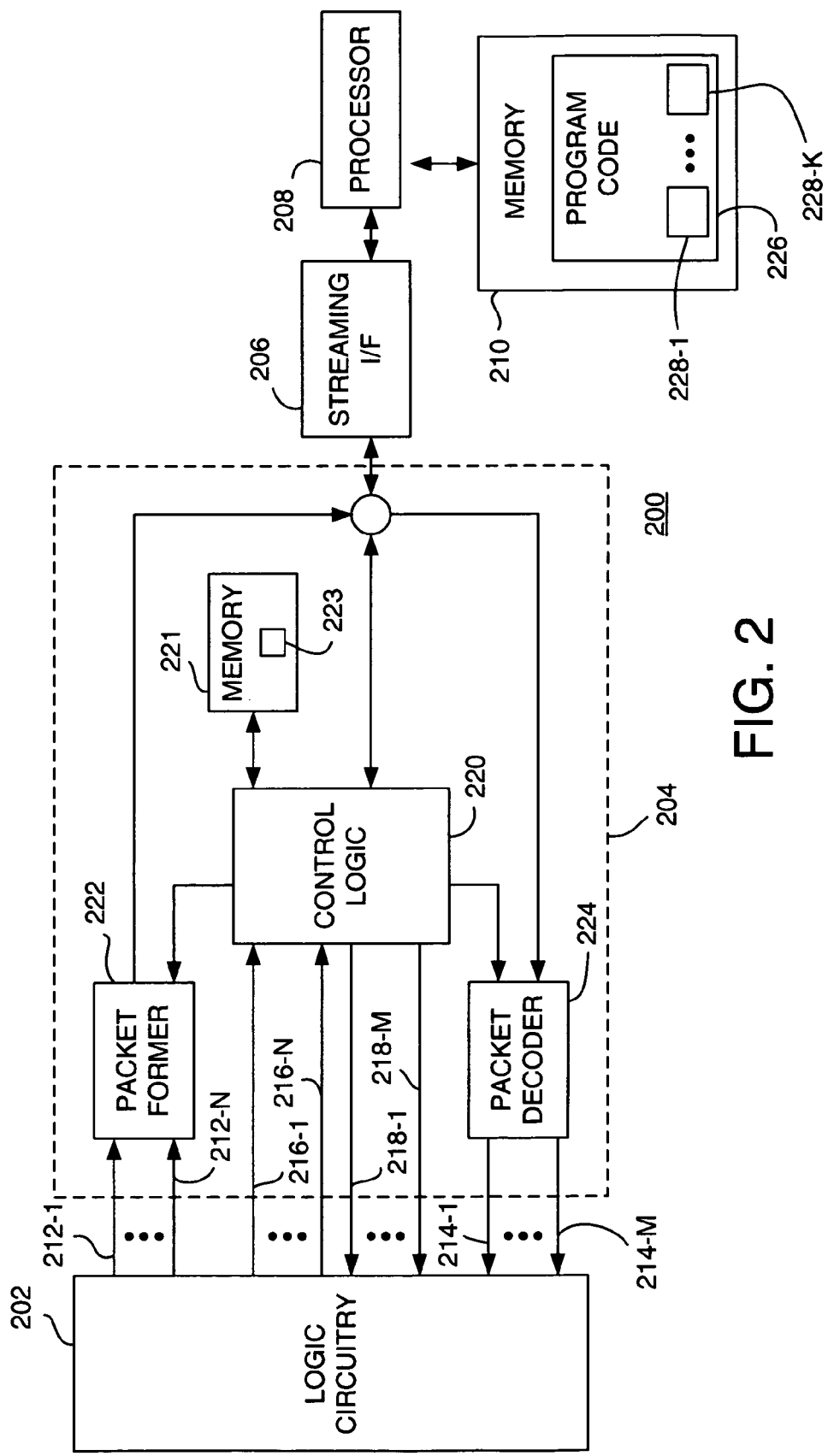
FIG. 2 is a block diagram depicting an exemplary embodiment of a computing system constructed in accordance with one or more aspects of the invention.

FIG. 2 is a block diagram depicting an exemplary embodiment of a computing system 200 constructed in accordance with one or more aspects of the invention. The computing system 200 includes logic circuitry 202, an interface circuit 204, a streaming interface 206, a processor 208, and a memory 210. The computing system 200 may be implemented using the FPGA architecture 100 of FIG. 1. Notably, the logic circuitry 202 may be instantiated in the configurable circuitry ("fabric") of an FPGA. Alternatively, the logic circuitry 202 may include dedicated hardwire circuitry or a combination or dedicated hardwire circuitry and configurable circuitry. The processor 208 may be a hard processor embedded within the FPGA, or a soft processor instantiated in the fabric of the FPGA. The streaming interface 206 may be instantiated in the fabric of the FPGA. Alternatively, the streaming interface 206 may include dedicated hardwire circuitry or a combination or dedicated hardwire circuitry and configurable circuitry. In one embodiment, the processor 208 comprises an IBM POWER PC processor, the interface circuit 204 is implemented using an Auxiliary Processing Unit (APU), and the streaming interface 206 comprises an APU interface. This embodiment can be implemented in the commercially available Virtex-4 FPGA from Xilinx Inc. of San Jose, Calif. An embodiment of the APU in the Virtex-4 FPGA is described in co-pending U.S. patent application Ser. No. 10/912,844, filed Aug. 6, 2004, entitled "Coprocessor Interface Controller", by Ahmad R. Ansari, et. al., which is herein incorporated by reference.

The logic circuitry 202 includes output data terminals 212-1 through 212-N (collectively referred to as output data terminals 212) and input data terminals 214-1 through 214-M (collectively referred to as input data terminals 214), where N and M are integers greater than zero. The logic circuitry 202 also includes input valid terminals 218-1 through 218-M respectively associated with the input data terminals 214-1 through 214-M, as well as output valid terminals 216-1 through 216-N respectively associated with the output data terminals 212-1 through 212-N. The input valid terminals 218-1 through 218-M are collectively referred to as input valid terminals 218, and the output valid terminals 216-1 through 216-N are collectively referred to as output valid terminals 216. Each of the input terminals 214, the output terminals 212, the input valid terminals 218, and the output valid terminals 216 has a width of one or more bits. The width of each of the input terminals 214 and output terminals 212 may be different from one another. In one embodiment, each of the input valid terminals 218 and the output valid terminals has a width of a single bit.

The logic circuitry 202 is in communication with the interface circuit 204 via the input data terminals 214, the input valid terminals 218, the output data terminals 212 and the output valid terminals 216. The interface circuit 204 is coupled to the processor 208 via the streaming interface 206. In particular, the interface circuit 204 includes control logic 220, a memory 221, a packet former 222, and a packet decoder 224. An input interface of the packet former 222 is configured to receive data from the output data terminals 212 of the logic circuitry 202. An output interface of the packet former 222 is coupled to the streaming interface 206. An input interface of the packet decoder 224 is coupled to the streaming interface 206. An output interface of the packet decoder 224 is configured to provide data to the input data terminals 214 of the logic circuitry 202. The control logic 220 is coupled to the output valid terminals 216, the input valid terminals 218, the memory 221, the streaming interface 206, the packet former 222, and the packet decoder 224.

The processor 208 is coupled to the memory 210 and the streaming interface 206. The streaming interface 206 is a point-to-point interface between the interface circuit 204 and the processor 208 (i.e., a non-arbitrated interface). The memory 210 is configured to store program code 226. The program code 226 includes functions 228-1 through 228-K (collectively referred to as functions 228), where K is an integer greater than zero.

In operation, the logic circuitry 202 accesses the functions 228 running on the processor 208 as if the functions 228 were logic circuits, rather than software. In particular, the processor 208 issues a blocking read instruction to the control logic 220 of the interface circuit 204 via the streaming interface 206. Until the blocking read instruction returns a value, the processor 208 remains in an idle state. In one embodiment, the processor issues a blocking quad-word read instruction (i.e., an instruction to read four data words).

The logic circuitry 202 produces output data via one or more of the output data terminals 212 in accordance with the function thereof. For example, the logic circuitry 202 may comprise network logic that produces internet protocol (IP)

packets as output. The control logic 220 monitors the output valid terminals 216 to identify which of the data output terminals 212 is providing valid data. Notably, the memory 221 is configured to store a table 223 that includes the functions 228, respective arguments, types of respective return values, and respective ones of the output data terminals 212 and the input data terminals 214 associated with the arguments and returns of the functions 228. For example, the table 223 may include an entry for a function F1, that accepts arguments A and B received via output data terminals 212-1 and 212-2 and returns an argument C provided to input data terminal 214-1.

Once the data on a particular set of output data terminals 212 associated with a particular function in the table 223 is valid, the control logic 220 instructs the packet former 222 to form a packet to convey the output data of the logic circuitry 202 as function argument data. In one embodiment, the packet formed by the packet former 222 includes a function descriptor. The function descriptor identifies the particular one of the functions 228 for which the remaining data in the packet are arguments. For example, the packet may comprise four data words, and the first data word may include the function descriptor. The remaining three data words may be used to convey function arguments. In one embodiment, each of the functions in the table 223 is assigned a priority. If valid output data exists that can be used by multiple functions, the control logic 220 may select the higher priority function. The selected higher priority function is then indicated by the function descriptor.

The control logic 220 returns the packet to the processor 208 via the streaming interface 206 in response to the blocking read instruction. The processor 208 identifies the desired one of the functions 228 from the function descriptor and the desired function is called with the packet as parametric input. Some of the functions 228 may require more arguments than can be conveyed by a single packet. In this case, the processor 208 issues one or more additional blocking read requests to obtain the additional packets from the interface circuit 204. The control logic 220 can identify whether a particular function requires additional arguments from the table 223 and causes the packet former 222 to produce the additional packets from valid output data as necessary.

Once the function has all the input data it requires, individual arguments are extracted from the packet(s). The arguments may be extracted from the packet(s) using casts, shift operations, mask operations, or the like. The function body is then executed by the processor 208 and return data is determined. The return data is packetized and sent towards the interface circuit 204 via the interface 206 using a write instruction. The return packet also includes a function descriptor, similar to the packet produced by the interface logic 204. In one embodiment, the processor 208 sends the return packet towards the interface circuit 204 using a quad word write instruction. The first data word of the return packet comprises the function descriptor and the remaining three data words comprise the return data.

The packet decoder 224 decodes the return packet to extract the return data and outputs the return data to the logic circuitry 202 via one or more of the input data terminals 214, as appropriate. The return data is provided to the logic circuitry 202 on a word-by-word basis (i.e., as soon as a word is available, it is presented to the logic circuitry 202). The control logic 220 informs the packet decoder 224 of the appropriate input data terminals by accessing the table 223 using the function descriptor in the return packet. The control logic 220 also asserts one or more of the input valid terminals 218, as appropriate. The logic circuitry 202 detects and obtains the valid input data.

Some of the functions 228 may return more data than can be conveyed by a single return packet. In this case, the processor 208 issues one or more additional blocking write requests to send the additional return packets to the interface circuit 204. The control logic 220 can identify whether a particular function returns additional data from the table 223.

For purposes of clarity by example, the computing system 200 has been described with respect to a hard processor 208 and an APU interface 206. In another embodiment, the processor 208 may comprise a soft processor, such as the MICROBLAZE processor and the streaming interface 206 may comprise a fast simplex link (FSL) interface. For details of the FSL interface, the reader is referred to Xilinx Application Note XAPP529 (version 1.3), published May 12, 2004, by Xilinx, Inc. While the FSL interface does not have quad word transfers similar to the APU interface, the FSL interface supports multiple transfers and blocking reads.

Exemplary software code executed by the processor 208 is shown below in the Appendix. Notably, the software code includes a function ICMP, a function RPC, and a function main. The processor 208 executes the main function, which causes the processor 208 to enter the idle loop, during which a blocking read instruction is issued to the streaming interface followed by a decode of the return data and the calling of either the ICMP function or the RPC function. The ICMP function has all the parameters it needs to run to completion, whereas the RPC function requires a further blocking read instruction to obtain additional data. Each of the ICMP function and the RPC function writes a return result as a write instruction to the streaming interface.

Figure 3:
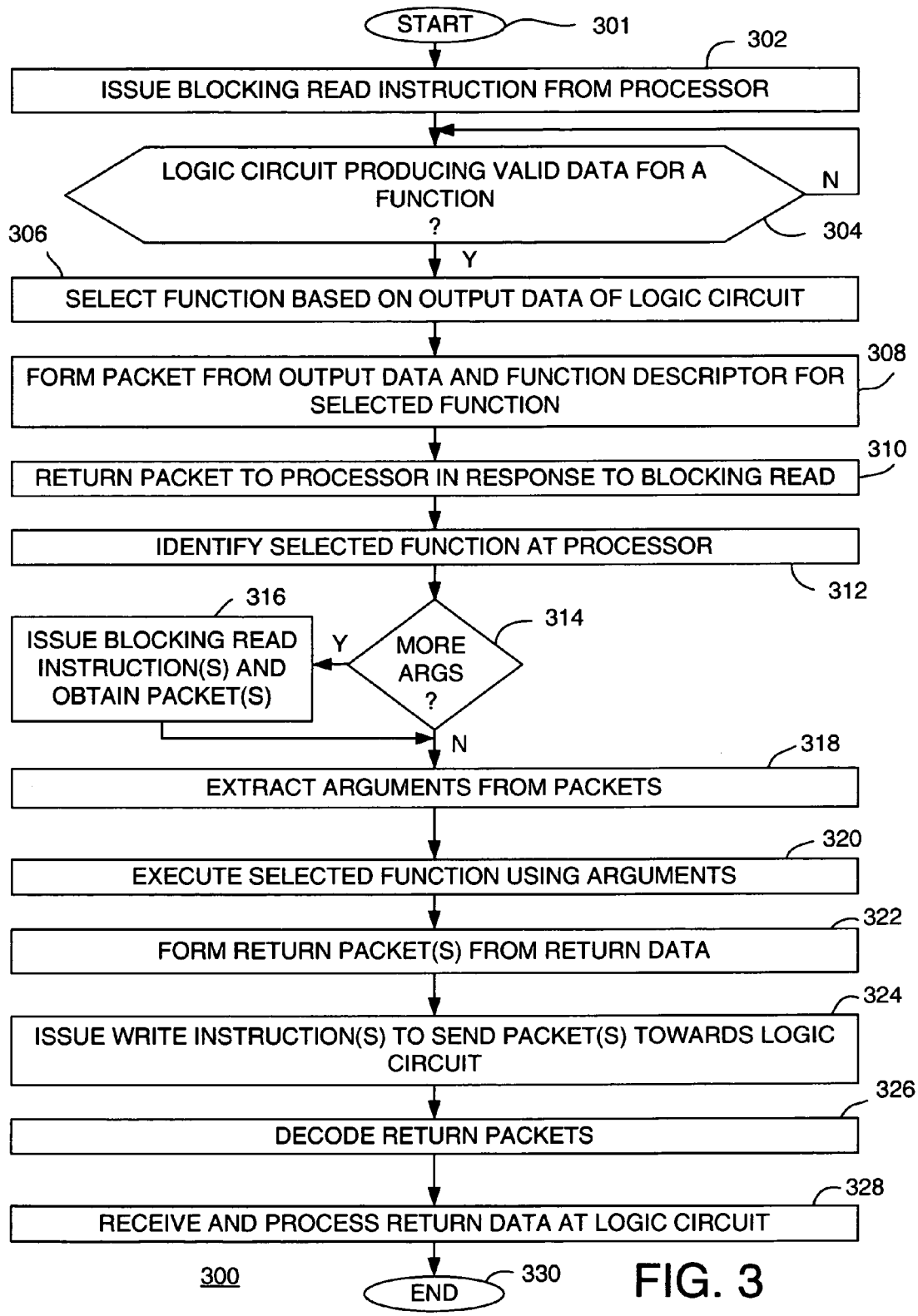
FIG. 3 is a flow diagram depicting an exemplary embodiment of a method of interfacing a logic circuit to a processor in accordance with one or more aspects of the invention.

FIG. 3 is a flow diagram depicting an exemplary embodiment of a method 300 of interfacing a logic circuit to a processor in accordance with one or more aspects of the invention. The method 300 begins at step 301. At step 302, a blocking read instruction is issued by the processor. At step 304, a determination is made whether the logic circuit is producing valid output data for a function executable by the processor. If not, step 304 is repeated until such valid output data is produced. If the logic circuit produces valid output data for a function, the method 300 proceeds to step 306. At step 306, a function to be executed is selected from a set of possible functions based on the valid output data. If valid output data corresponds to multiple functions, a function may be selected based on a priority value assigned to each function in the function set.

At step 308, a packet is formed from the valid output data and a function descriptor for the selected function. At step 310, the packet is returned to the processor in response to the blocking read instruction. At step 312, the processor identifies the selected function from the function descriptor in the packet. At step 314, a determination is made whether the selected function requires more arguments. If so, the method 300 proceeds to step 316, where one or more additional blocking read instructions are issued and one or more additional packets are obtained. The method 300 then proceeds to step 318. If, at step 314, the selected function does not require more arguments, the method 300 proceeds directly to step 318.

At step 318, the processor extracts arguments for the selected function from the received packet(s). At step 320, the processor executes the selected function using the extracted arguments as parametric input. At step 322, one or more return packets are formed from return data produced by the selected function. At step 324, one or more write instructions are issued by the processor to send the return packet(s) towards the logic circuit. At step 326, the return packet(s)

is/are decoded to extract output data. At step 328, the logic circuit receives and processes the output data. The method 300 ends at step 399.

Figure 4:
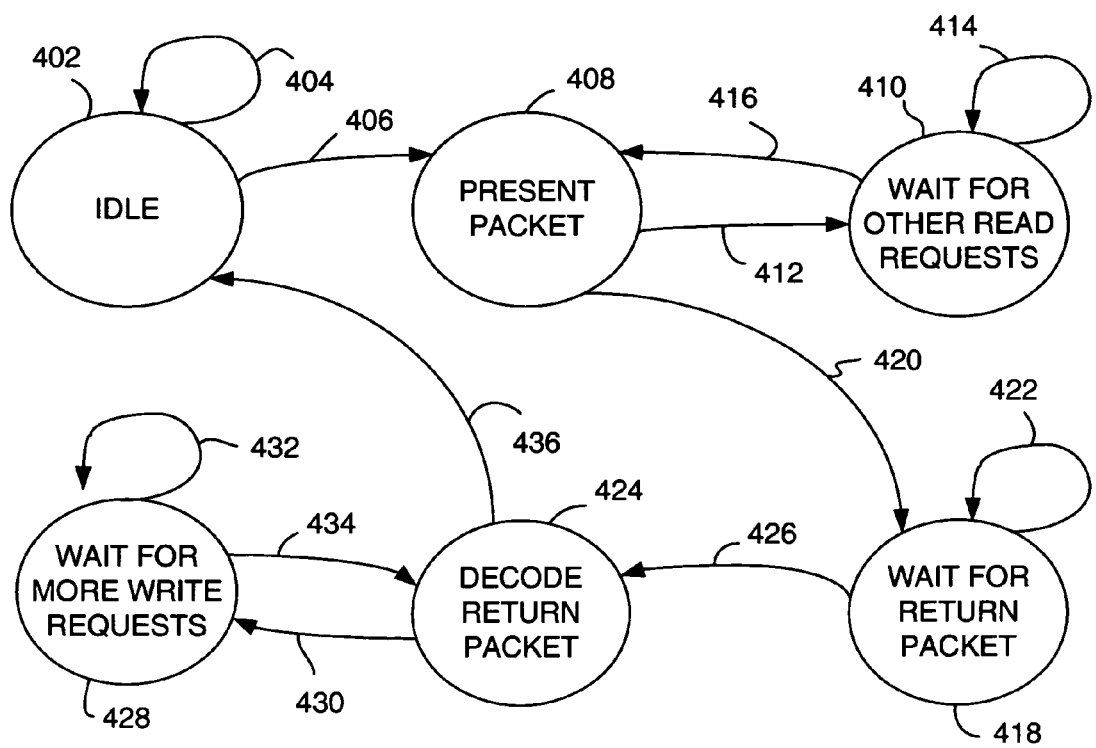
FIG. 4 is state diagram depicting an exemplary embodiment for operation of control logic of FIG. 2 in accordance with one or more aspects of the invention.

FIG. 4 is state diagram depicting an exemplary embodiment for operation of the control logic 220 of FIG. 2 in accordance with one or more aspects of the invention. The control logic 220 is initialized in an idle state 402. In the idle state 402, the control logic 220 examines which of the functions in the table 223 are candidates to be executed by the processor 208 based on the output valid terminals 216. If no candidates are found, the control logic 220 remains in the idle state 402 (condition 404). If a candidate is found, the control logic 220 transitions to a state 408 (condition 406). At the state 408, the control logic 220 causes the formation of a packet for the selected function and the transmission of the packet to the processor 208 via the APU 206.

If the selected function requires more arguments than those transmitted in the packet, the control logic 220 transitions to a state 410 (condition 412). At the state 410, the control logic 220 waits for other read request(s) from the processor (condition 414). If another read request is received, the control logic 220 transitions back to the state 408 (condition 416) where another packet is formed. If the selected function does not require more arguments at state 408, the control logic 220 transitions to a state 418 (condition 420). At the state 418, the control logic 220 waits for a return packet (condition 422). If a return packet is received, the control logic 220 transitions to a state 424 (condition 426). At the state 424, the control logic 220 causes the return packet to be decoded. If more return packets are to be received, the control logic 220 transitions to a state 428 (condition 430). At the state 428, the control logic 220 waits for more return packets (condition 432). If an additional return packet is received, the control logic 220 transitions back to the state 424 (condition 434). If no additional packets are to be received, the control logic 220 transitions from the state 424 to the idle state 402 (condition 436).

Method and apparatus for providing an interface between a logic circuit and a processor has been described. In one embodiment, logic-centric signals produced by a hardware circuit are packetized to provide argument data for a function executable by a processor. The processor supports multiple functions, each of which has various arguments. The packetized data is sent to the processor via a streaming interface and the appropriate function is executed using argument data extracted therefrom. Return data is then packetized and sent towards the hardware circuit via the streaming interface. The packetized return data is then decoded and logic-centric signals are provided to the hardware circuit. In this manner, data is exchanged between software and hardware domains, without compromising the logic-centric nature of the overall architecture.

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. Claim(s) listing steps do not imply any order of the steps. Trademarks are the property of their respective owners.

APPENDIX

```
unsigned int ptr[PACKET_SIZE];
void ICMP(unsigned int *p) {
  unsigned int *packet = p;
  unsigned int ICMPtype, ICMPchecksum;
/*
```

APPENDIX-continued

```
Ingress packet looks like this
|****|****|****|****|
| Function|  Size       |
|         |    ICMPtype|
|         |    Checksum|
|         |            |
|****|****|****|****|
Type has already been checked by the smart memory we just recalculate
the checksum
*/
    /* Update ICMP checksum for change to type field */
    ICMPchecksum = packet[2];
    packet[2] = ICMPchecksum >= 0xF7FF ? ICMPchecksum−0xF7FF:
    ICMPchecksum + 0x0800;
    packet[1] = 28;
    apu_loadquadword(packet, 4);
}
void sendDropPacket(unsigned int *packet) {
    packet[0] = DROP_PACKET;
    apu_loadquadword(packet, 4);
}
void RPC(unsigned int *p) {
  unsigned int *packet;
  unsigned int RPCport;
  unsigned int RPCprocedure;
  unsigned int RPCprogram;
  unsigned int RPCparam1;
  unsigned int RPCparam2;
/*
Ingress packet looks like this
|****|****|****|****|
| Function|  Size       |
|         |    RPC port|
| RPC Procedure         |
| RPC Program           |
|****|****|****|****|
| RPC Param 1           |
| RPC Param 2           |
|         |             |
|         |             |
|****|****|****|****|
*/
    packet = p;
    p+=4;
    apu_storequadword(p, 0, p);
    // Packet now contains the RPC ingress data
    // Lets rip it out for ease of writing the program, compiler
    // will just use packet
    RPCport = packet[1];
    RPCprogram = packet[2];
    RPCprocedure = packet[3];
    // Prog is packet 4 but I don't think we need it
    RPCparam1 = packet[5];
    RPCparam2 = packet[6];
    switch (RPCport) {
      case 111 : // Portmap
...
    }
}
int main (void) {
  while (1) {
    // Point to start of scratchpad
    p = packet;
    // Blocking read of 128 bits
    apu_storequadword(p, 0, p);
    // Decode function
    function = p[0] & 0xffff0000;
    switch (function) {
      case RPC_FUNC_ID :
              RPC(p);
              break;
      case ICMP_FUNC_ID :
              ICMP(p);
              break;
    }
  }
  return 0;
}
```

We claim:

1. A method of interfacing a programmable circuit and a processor, comprising:
   executing a blocking read instruction on the processor, where the processor remains in an idle state until the blocking read instruction returns;
   identifying a data output terminal of a plurality of data output terminals of the programmable circuit which is providing valid data in response to the blocking read instruction;
   receiving the valid data output from the identified data output terminal;
   packetizing the valid data output from the identified data output terminal of the programmable circuit to form at least one packet;
   providing the at least one packet to the processor via a streaming interface as a return to the blocking read instruction, the streaming interface comprising a non-arbitrated interface including a point-to-point streaming interface;
   extracting the valid data from the at least one packet;
   executing a function on the processor using the valid data as parametric input;
   packetizing return data produced by the function in response to the parametric input to produce at least one return packet; and
   sending the at least one return packet towards the programmable circuit via the streaming interface.

2. The method of claim 1, wherein a packet of the at least one packet includes a function descriptor, and wherein the method further comprises:
   selecting the function for execution by the processor from a plurality of functions in response the function descriptor.

3. The method of claim 2, wherein the function descriptor is generated automatically in response to the valid data output from the programmable circuit.

4. The method of claim 3, wherein the function descriptor is generated in response to a priority value associated with each of the plurality of functions.

5. The method of claim 1, further comprising:
   extracting the return data from the at least one return packet; and
   providing the return data to the programmable circuit.

6. The method of claim 5, wherein a return packet of the at least one return packet includes a function descriptor, and wherein the return data is provided to the programmable circuit using at least one signal line of a plurality of signal lines, the at least one signal line being selected in response to the function descriptor.

7. The method of claim 1, wherein the processor comprises a hard processor embedded in an integrated circuit, and wherein the streaming interface comprises an auxiliary processor unit (APU) interface.

8. The method of claim 1, wherein the processor comprises a soft processor configured within a programmable logic device (PLD).

9. Apparatus for interfacing a programmable circuit and a processor, comprising:
   control circuit configured to packetize data output from the programmable circuit to form at least one packet, the control circuit identifying a data output terminal of a plurality of data output terminals of the programmable circuit which is providing valid data in response to a blocking read instruction issued by the processor and enabling the selection of the identified data output terminal; and
   a streaming interface for providing the at least one packet to the processor as a return to the blocking read instruction issued by the processor, the streaming interface comprising a non-arbitrated interface including a point-to-point streaming interface;
   wherein the processor is configured to extract the valid data from the at least one packet and execute a function using the valid data as parametric input; and to packetize return data produced by the function in response to the parametric input to produce at least one return packet, wherein the streaming interface is configured to provide the at least one return packet to the control circuit.

10. The apparatus of claim 9, wherein a packet of the at least one packet includes a function descriptor, and wherein the processor is configured to select the function for execution from a plurality of functions in response to the function descriptor.

11. The apparatus of claim 10, wherein the control circuit is configured to generate the function descriptor automatically in response to the valid data output from the programmable circuit.

12. The apparatus of claim 11, wherein the control circuit is configured to generate the function descriptor in response to a priority value associated with each of the plurality of functions.

13. The apparatus of claim 9, wherein the control circuit is configured to extract the return data from the at least one return packet and provide the return data to the programmable circuit.

14. The apparatus of claim 9, wherein the processor comprises a hard processor embedded in an integrated circuit, and wherein the streaming interface comprises an auxiliary processor unit (APU).

15. The apparatus of claim 9, wherein the processor comprises a soft processor configured within a programmable logic device (PLD).

16. An integrated circuit, comprising:
   a circuit;
   a control circuit configured to packetize data output from the circuit to form at least one packet, the control circuit identifying a data output terminal of a plurality of data output terminals of the circuit which is providing valid data in response to a blocking read instruction and enabling the selection of the identified data output terminal;
   a processor configured to execute the blocking read instruction, extract the valid data from the at least one packet as a return to the blocking read instruction, and execute a function using the valid data as parametric input;
   a streaming interface for providing the at least one packet to the processor, the streaming interface comprising a non-arbitrated interface including a point-to-point streaming interface, and
   wherein the processor is configured to packetize return data produced by the function in response to the parametric input to produce at least one return packet, wherein the streaming interface is configured to provide the at least one return packet to the control circuit.

17. The integrated circuit of claim 16, wherein the streaming interface comprises an auxiliary processor unit (APU).

* * * * *